Inventor:
Edwin S. Johnson

United States Patent Office 3,432,234
Patented Mar. 11, 1969

3,432,234
DOCUMENT TRANSPORT AND GUIDE FOR OFFICE COPIERS
Edwin S. Johnson, Glenview, Ill., assignor to Bell & Howell Company, Chicago, Ill., a corporation of Illinois
Filed Feb. 7, 1966, Ser. No. 525,476
U.S. Cl. 355—75                                     21 Claims
Int. Cl. G03b 27/32, 41/02

ABSTRACT OF THE DISCLOSURE

An original document transport and guide structure including an improved turn-around assembly and a scanning aperture device aligned with the exit side of said turn-around having a superimposed document backup hold down plate floatingly opposing the aperture to guide a moving document in a scanning plane. The document backup hold-down plate has spacer projections to provide a fixed minimum gap for guiding the passage of the document and is gravitationally biased toward the position of minimum spacing. The backup plate is yieldably against the gravitational bias to accommodate thick documents, multiple document assemblies, paper splices, staples and the like. Light weight sheets as well as heavy or thick documents are thereby transportable in the device while maintaining the document in the focal plane of the scanning aperture device, without danger of jamming. Both the turn-around and aperture device are of modular construction, gravitationally supported on the frame of the machine and therefore readily removable for cleaning and maintenance.

---

This invention relates to improvements in copymaking machines, especially of the so-called office copier type, and more particularly concerns a new and improved turn-around for paper transport and guide structure including a scanning means for accurately positioning a document to be copied in correct optical alignment with the lens system of the device by means of a gravitationally biased pressure plate position opposite a transport plate and yieldable against the gravitational bias to accommodate sheets of different thickness.

In office copiers a sheet or document bearing original image material to be copied is transported across a scanning aperture where the information-carrying face of the sheet or document is illuminated and scanned through an optical system, thereby transmitting the image of the scanned document face to an exposure zone in which the projected image is focused onto an appropriate copying media at the focal plane. Various kinds and thicknesses of paper must be accommodated, as well as multiple sheet document assemblies, paper splices, staples, and the like in the transport and scanning aperture system, through which successive documents must travel at high speed without danger of jamming.

In accordance with the invention, the original document is carried into the casing of a machine by a transport device and is reversely turned by the combination of a large diameter curved guide track associated with powered transport rollers at opposite ends.

On the return leg of the transport device, the original document passes through a scanning station characterized by a gravitationally biased hold-down or pressure plate which operates to position the image bearing face in flat engagement with a flat transport backing face, disposed in correct alignment with the optical system of the machine. The components of the guide track and the transport device are readily removable for cleaning and maintenance purposes.

Figure 1:
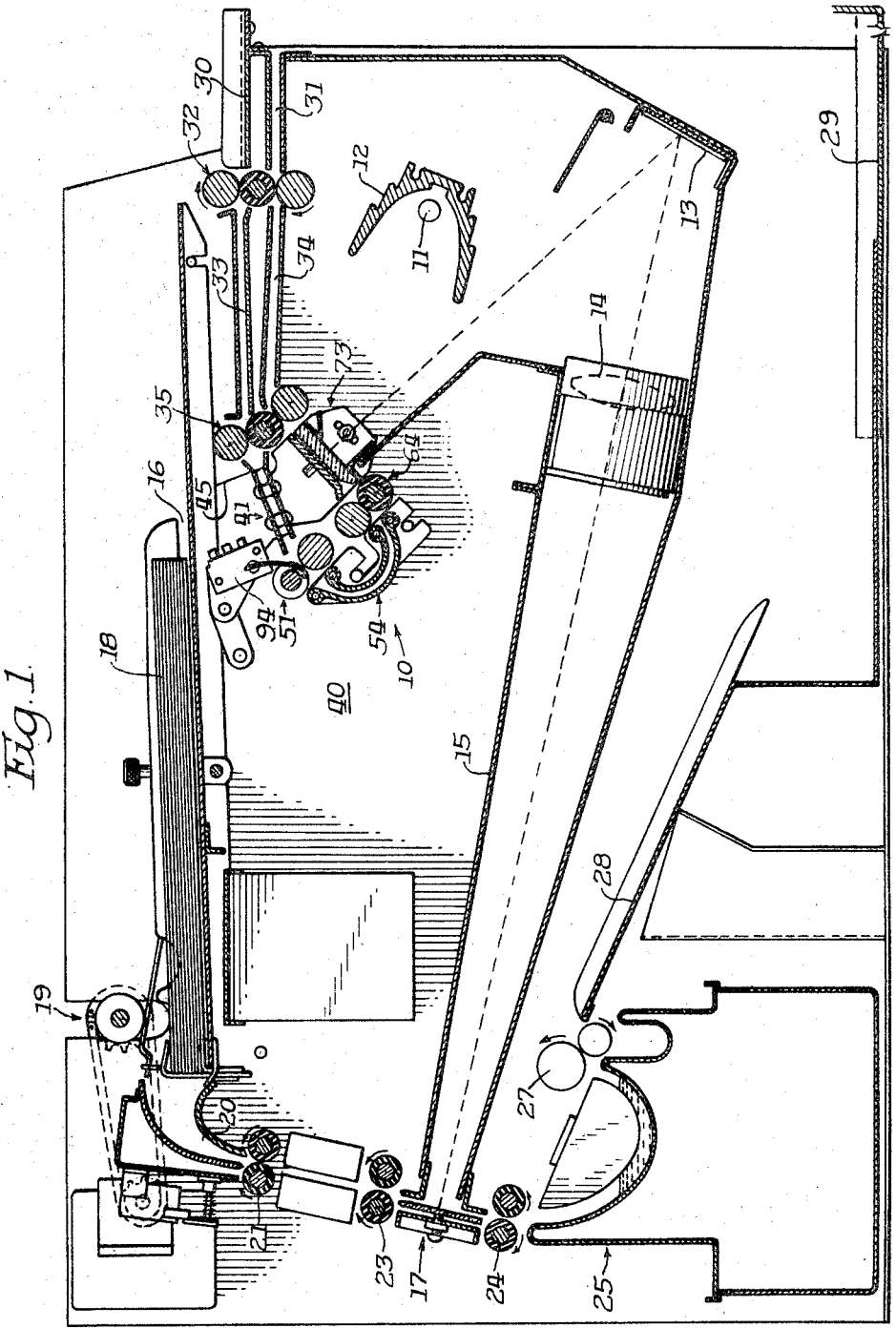
Figure 2:
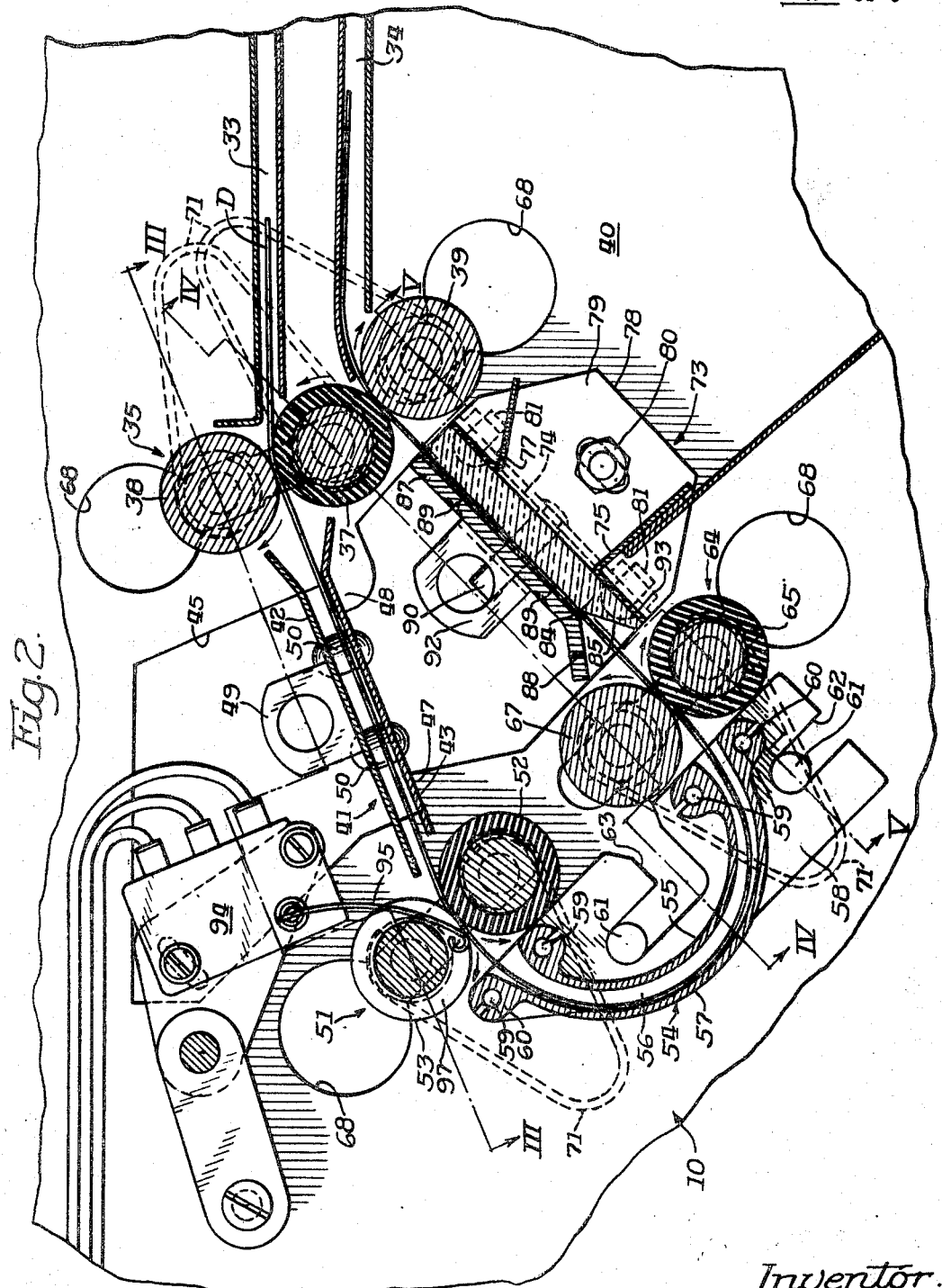
Figure 3:
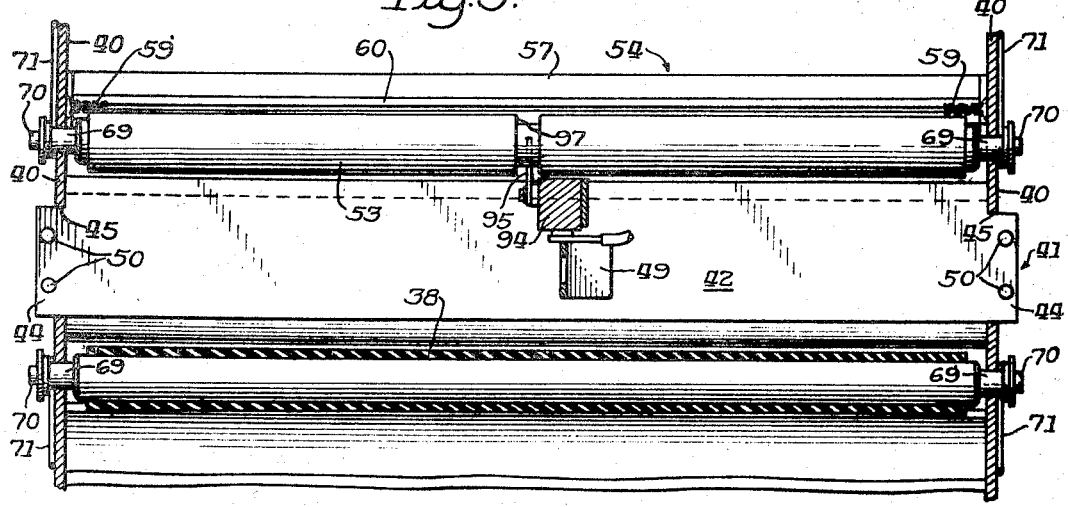
Figure 4:
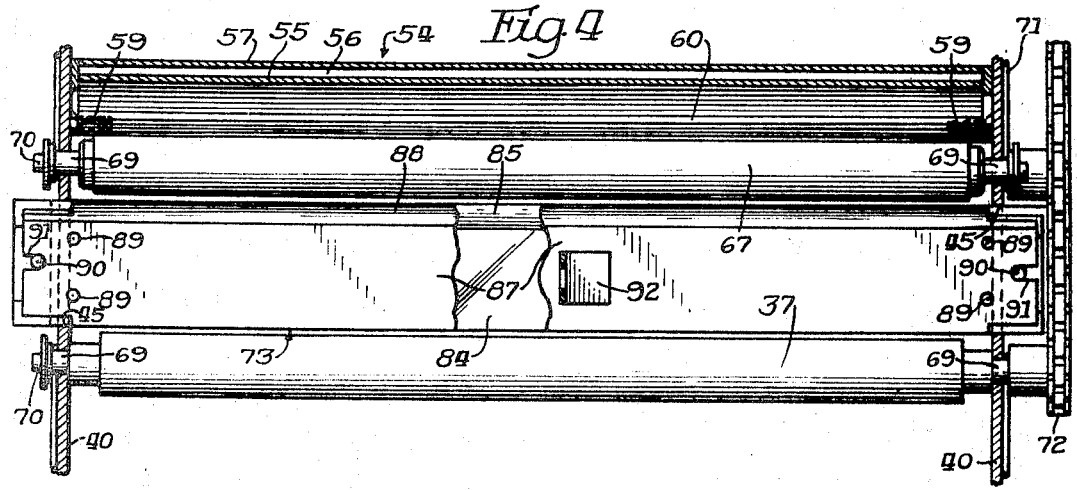
Figure 5:
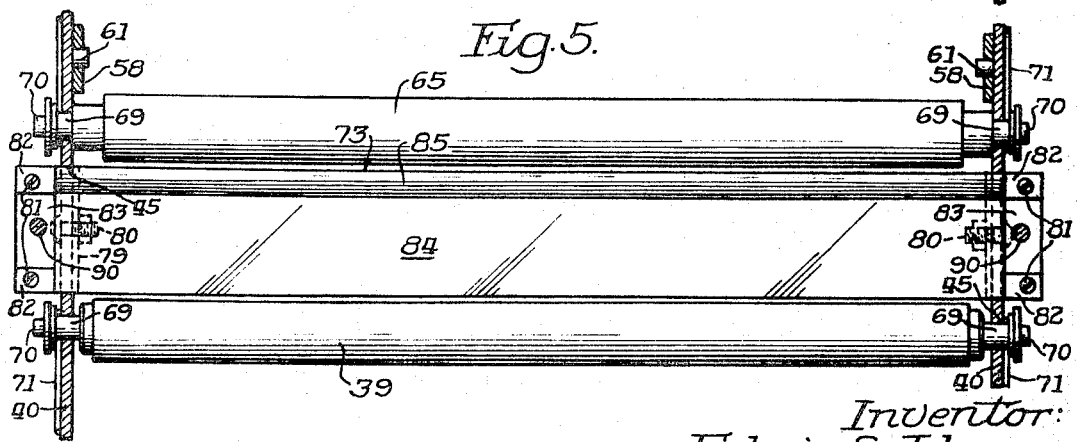

On the drawings:
FIGURE 1 is a more or less schematic longitudinal vertical sectional detail view through an electrophotographic copymaking machine, embodying features of the invention;
FIGURE 2 is an enlarged fragmentary sectional and elevational view showing the document transport and scanning aperture structure of FIGURE 1;
FIGURE 3 is a fragmentary sectional plan view taken substantially on the line III—III of FIGURE 2.
FIGURE 4 is a sectional plan view taken substantially on the line IV—IV of FIGURE 2; and
FIGURE 5 is a sectional plan view taken substantially on the line V—V of FIGURE 2.

As shown on the drawings:
Apparatus embodying features of the invention comprises (FIGURE 1) a suitable cabinet, housing therein supporting frame means mounting in the upper front portion of the cabinet a document transporting and scanning aperture assembly 10. Therebelow in the forward portion of the cabinet is mounted an illuminating lamp 11 with which is associated a parabolic reflector 12 concentrating the light into the scanning aperture for scanning of the image to be copied and duplicated by means of a scanning mirror 13 comprising part of an optical system and reflecting the scanned image into a condensing lens assembly 14 which projects the image through a light tunnel 15 rearwardly and focuses it into an exposure aperture defined by an assembly 17. Copy sheets 18 within a magazine 16 in the upper part of the cabinet are fed one at a time by suitable feed means, rearwardly and downwardly through a guide 20 to advancing rollers 21 and rollers 23 through the exposure aperture where an image of the document information is explosed on a focal plane in which the copy sheet is positioned. The copy sheet is driven by a further set of rollers 24 through a developer assembly 25. Thence, rollers 27 advance the developed copy sheet onto a chute 28 which directs the copy downwardly and forwardly to a copy tray 29 in the bottom forward portion of the cabinet.

This invention is directed to certain new and improved combinations and features of the document transport and scanning aperture assembly 10 which is constructed and arranged to receive a document, generally in the form of a paper sheet, transport it inwardly, turn it around and regressively move the document through a scanning plane and then discharge the document. This is accomplished at high speed and within a compact space in the upper front portion of the machine cabinet, and is thus well suited for small table models of the machine.

To facilitate hand feeding of successive documents to be copied into the machine, an upwardly facing receiving ledge 30 is provided on the upper front portion of the machine and directly below which are means defining a discharge slot 31. Since the turnaround transport and scanning assembly 10 must, for convenience, be located a substantial distance inwardly from the front of the cabinet, a set of three document driving rollers 32 is mounted in alignment with the ledge 30 and the discharge slot 31 to feed the document from the ledge into and through an inwardly directed document delivery passage 33 defined between a pair of suitable guide plates, while the discharge slot 31 is aligned with a discharge passage 34 defined between a pair of guide plates below the passage 33.

Operatively adjacent to the inner ends of the passages 33 and 34 is a first set of document transport rollers 35 comprising part of the assembly 10 (FIGURES 1 and 2). These rollers comprise a positively driven intermediate friction roller 37, an upper idler roller 38 providing therewith a nip aligned with the inner, delivery end of the delivery passage 33, and a lower idler roller 39 providing with the intermediate roller 37 a nip aligned with the inner, entry end of the discharge passage 34. Mounting of the set of rollers 35 is conveniently effected on and between spaced upright side frame structure comprising parallel frame plates 40 (FIGURES 2–5).

Setting of the idler roller 38 relative to the driven roller 37 is such that as a document D enters the nip of these rollers it is diverted into an inward and downwardly oblique path into an upper transfer guide 41 comprising an upper plate 42 and a lower plate 43 defining therebetween a guideway of substantial slot width and with longitudinal edges on the plates flared apart to define a mouth aligned with the off-running side of the delivery roller nip for efficient reception of the leading end of the document. In a desirable construction, the transfer guide assembly 41 is constructed as a readily removable unit, not only facilitating assembly into operative position of the machine, but also facilitating quick removal for clearing out a document in the unlikely event of a jam. To this end the opposite margins of the plates 42 and 43 extend to a length close to the spacing between the side frame plates 40, with reduced width end portions 44 of the guide plates extending a limited distance outwardly through respective similar aligned clearance apertures 45 in the frame plates and of substantially the same width as the width of the guide plate end portions. At the opposite sides of the aperture 45 are upwardly facing respective coplanar obliquely oriented supporting shoulders 47 and 48 on which the lower guide plate 43 rests with the marginal ends of plate assembly retainingly opposing the inner faces of the frame plates 40. Above the shoulders 47 and 48 the aperture 45 is suitably upwardly elongated to enable insertion or removal of the guide assembly 41 therethrough. A handle 49 intermediately on the upper guide plate 42 facilitates manipulation of the assembly. Unitary attachment of the guide plates 42 and 43 to one another in the assembly is conveniently effected by means of rivet spacer studs 50 secured to and between the end portions 44 of the plates.

Immediately beyond the inner or discharge side of the transfer guide 41 is a second set of transport rollers 51 comprising a driven lower friction roller 52 and an upper idler roller 53 with the nip set to bend the inwardly advancing document D slightly downwardly into the aligned mouth of an arcuate turnaround throat 56 defined by a turnaround device 54.

In accordance with this invention, turnaround device 54 comprises a readily mountable and removable unit comprising a pair of complementary arcuately cross-section elongated plates comprising an inner plate 55 and an outer plate 57 providing opposed arcuate guide surfaces defining therebetween the throat 56. It will be noted that the device 54 extends through 180° of arc in an extended wide sweeping arc having a radius of curvature greater than the diameter of the associated transport rollers. Thus, any sheet-form original directed through the device 54 will not be subjected to such a severe reversely turning action as to permanently set or fold the sheet and the turnaround function will be greatly enhanced. At their opposite ends, the turnaround plates 55 and 57 are secured to respective complementary mounting bracket plates 58 as by means of self-threading drive screws 59 engaging in respective longitudinally bored mounting ribs 60 on the plates. To enable ready removal of the turnaround unit 54 in the unlikely event of a jammed document, it is mounted on and between the side frame plates 40 and through a pin and slot connection comprising at each side a lower and an upper mounting pin 61 suitably spaced apart and fixedly carried by the respective frame plates. A generally downwardly opening slot 62 receives the lower pin 61 and a bayonet slot 63 receives the upper pin 61. Therefore, similarly as the transfer guide 41, the turnaround paper guide 54 is gravitationally supported on the frame plates 40.

Within the turnaround 54, the document D is guided to move from an inward direction downwardly and generally forwardly with the exit from the throat 56 oriented in a generally upward and forward direction to place the information face of the document, which was upward for convenient reading when it was placed on the feed-in or insertion tray, into a scanning plane which faces generally downwardly and forwardly toward the scanning mirror 13. The width of the throat 56 is relatively small, but large enough to guide even fairly stiff paper documents therethrough without difficult. Immediately beyond the exit end of the throat 56, the document enters the nip of a third set 64 of transport rollers comprising a lower driven friction roller 65 and an upper idler roller 67 set to drive the document onward in the desired scanning plane.

To facilitate mounting of the several sets of document transporting rollers 35, 51 and 64, suitable respective keyhole slots 68 are provided in the frame plates 40 enabling clearing of the rollers through the large portions of the slots and accommodating respective bearings 69 for respective journals 70 on the opposite end of the rollers within the elongated narrower portions of the mounting slots. Suitable hairpin springs 71 are engaged with the bearings of the companion rollers to urge them yieldably into nipping relation (FIGS. 2–5). Suitable means for driving the several sets of rollers in unison may comprise an endless flexible driving device such as a sprocket chain 72 (FIG. 4).

Immediately after leaving the document transport roller assembly 64, the document is guided in a scanning station by means of a scanning aperture device 73 aligned between the rollers 64 and the first set of rollers 35 and more particularly the intermediate and lower rollers 37 and 39. On its lower portion, the device 73 includes means defining a scanning aperture 74 and comprising a rear and lower generally L-cross section aperture-defining transverse frame bar 75 and a forward, upper, generally V-shaped cross section transverse flange frame bar 77. Completing the aperture frame is a pair of preferably identical left and righthand angular mounting brackets 78, each of which has a generally downwardly extending attachment flange 79 which engages the inner face of the respectively associated side panel 40 and is desirably fixedly attached thereto as by means of a screw 80. Each of the aperture frame bars 75 and 77 has a downward flange which is of a length to extend between the bracket flanges 79. Attachment of the bars 75 and 77 to the brackets 78 is by means of respective screws 81 which fasten respective opposite end extension flange portions 82 of the upper flanges of the bars to respective laterally outwardly extending flanges 83 on the upper edges of the bracket flanges 79 (FIGS. 2 and 5). This completes the substantially rigid aperture frame, with the top flanges of the aperture frame bars extending in opposite direction from the aperture 74 and oriented in a common plane by the flat face-to-face engagement of the flange extensions 82 on the bracket flange 83.

Mounted on the aperture frame are means for guiding the document in as nearly as practicable a flat scanning plane in proper optical alignment with the optical system of the apparatus so that a sharp fixed scanning focus is enabled by proper adjustment of the optical system. To this end, a transparent aperture plate 84, desirably of a heat-resistant glass, and having opposite flat parallel faces is mounted over the aperture 74 to present a smooth bottom guide surface for the document and to prevent the leading edges of successive documents from any possible deflection into the aperture. This aperture plate is of a length to overlie the entire length of the aperture 74 and of a width preferably substantially equal to the width of the bracket flanges 83. At the approach side of the aperture, the aperture plate 84 has its document-opposing margin chamfered to provide a lead-in cam surface 85.

In accordance with this invention a gravitationally biased hold down plate is used to insure that the sheet form original is properly positioned in the exposure plane. Since the turn around device positions the original face down, the hold down device can be positioned above the plate 84, thereby allowing gravitational bias to act thereon. Accordingly, if different thicknesses of sheets pass through the device, the hold down plate will yield against the gravitational bias to accommodate such varying thickness while fulfilling its intended function.

Superimposed on the plate 84 is a substantially floatingly mounted document backing holddown guide plate 87 (FIGS. 2 and 4) which is at least throughout the extent of the aperture 74 of substantially the same width as the aperture plate and has its margin at the approach side of the aperture turned up to provide a lead-in cam flange 88 affording a lead-in surface substantially complementary to the chamber 85 whereby to define therewith a relatively wide entry mouth into the interface scanning guide plane between the plates. Desirably, a fixed narrow interface guide gap is provided between the plates, as by the provision of a pair of spacer projections, dimples or nodes 89 adjacent to the opposite ends of the backing or holddown plate 87 and respectively adjacent to the opposite margins of this plate. This disposition of the spacer nodes 89 is outside of the maximum width path traveled by the widest document that can be accommodated in the transport system. The dimensional extent of such nodes 89 is approximately 0.010 inch. A thin sheet of paper such as a sheet of onionskin paper can be accommodated since the sheet can freely travel through the gap space between the plates. Further, by keeping the gap narrow, fluttering of lightweight sheets, which may throw the face of the document out of focus as it passes the scanning aperture may be avoided. Sheets which are heavier than 0.010 inch are stiff enough to easily raise the plate 87 against the gravitational bias without crumpling the sheet material.

Means are provided for maintaining the aperture guide plates 84 and 87 assembled in proper registration with one another and with the aperture frame, but especially with respect to the backing holddown plate 87 in a gravitationally floating relationship. Accordingly, both of the plates 84 and 87 are of a length to overlie the aperture frame bracket flanges 83, with the aperture plate 84 shorter than the plate 87. Extending fixedly upwardly intermediately on each bracket flanges 83 is a retaining and guide pin 90 which retainingly opposes the respective adjacent end of the aperture plate 84 and avoids endwise displacement of such plate from its operative position. Retention of the plate 87 against both endwise and transverse displacement from operation positions is effected by engagement of the pins 90 in respective endwardly opening respective notches 91 in the end portions of this plate. This arrangement, however, affords freedom for floating upward displacement of the backing holddown plate 87 to accommodate documents which are thicker than the fixed spacing between the plates afforded by the spacer nodes 89, multiple sheet documents, splices, staples, and the like. Further, this mounting of the plate 87 permits it to be quickly manually lifted to clear the scanning guide passage should a document jam occur. Desirably a handle 92 is mounted at an intermediate position on the back or upper face of the holddown plate 87 to facilitate manipulation of the plate.

Retention of the aperture plate 84 against transverse displacement from operative position is effected by opposition of the end portions of the opposite longitudinal edges of this plate by respective opposite shoulder edges defining the lower portion of the clearance aperture 45 in each of the side plates 40 through which the bracket flanges 83 extend. Defining the bottom of each of the apertures 45 is an edge 93 in a plane parallel to the desired scanning plane and which edge is adapted to be engaged as a plane-orientation shoulder by the respective associated bracket flanges 83. It will be apparent that the scanning aperture device 73 is adapted to be assembled as a unit and then installed in place in its operative position in the document transport and scanning system under the transfer guide unit 41.

It should further be noted that, for easy accessibility, the guides 41, 54, 87 and the plate 84 may be readily removed from either side of the machine or through the top of the machine. As all these guides and the plate 84 are gravitationally mounted, no tools are necessary to remove them. This is especially convenient since it is desirable to clean the transparent aperture plate 84 occasionally to insure uniformly high quality copies.

It will be understood, of course, that operation of the machine may be effected through suitable electrically powered means, with controls automatically synchronizing movement of a copy sheet 18 through the exposure aperture with movement of a document sheet D through the scanning aperture 74. Among such controls may be a control switch 94 suitably mounted to position an actuating trip arm 95 thereof in the path of movement of the document D, in this instance being responsive to movement of the document through the second set of transport rollers 51, the roller 53 having a suitable groove 97 therein to accommodate the trip arm.

It will be understood that modifications and variations may be effected without departing from the scope of the novel concepts of the present invention and I wish to embody within the scope of the patent warranted hereon all such modifications as reasonably and properly come within the scope of my contribution to the art.

I claim as my invention:

1. In a copying machine:
    means forming a scanning station including a flat surface establishing a scanning window disposed in an optical plane,
    and holddown means for retaining a moving sheet member flatly against said surface comprising:
        a flat member substantially coextensive in size with said window,
        and guide means retaining said flat member for gravitational bias towards and away from said plane.

2. A copymaking machine of the character described including a system for transporting a document from an infeed position to a discharge position and having in the system between said positions a scanning aperture device comprising:
    scanning aperture-defining means; and a freely floating document backup holddown plate superimposed on said aperture-defining means over said aperture and gravitationally biased toward said aperture-defining means to guide a document in a scanning plane across the aperture, said holddown plate being displaceable away from said aperture-defining means by a thick document, staple, or the like.

3. A machine as defined in claim 2, in which said holddown plate has spacer projections engaging the transparent plate and defining a predetermined guide gap between the plates.

4. A machine as defined in claim 2, in which said aperture-defining means comprise a frame, a transparent document guide plate mounted in superimposed relation or said frame, and said holddown plate being mounted on said transparent plate.

5. A machine as defined in claim 4, in which said frame has upstanding pin means thereon retainingly cooperating with said transparent plate.

6. A machine as defined in claim 4, including supporting means to which said frame is attached, and said supporting means having means thereon cooperating with said transparent plate to retain it in operative position.

7. A machine as defined in claim 2, in which said aperture defining means and said plate have pin and slot interconnection retaining the plate operatively related to the aperture but permitting said free floating displacement of the plate.

8. A machine as defined in claim 2, including supporting structure comprising side frame means, said aperture defining means including mounting brackets, means on said brackets floatingly guiding said holddown plate, and means securing said brackets to said side frame means.

9. In a copying machine:
sheet transport means comprising:
two pairs of transport rollers spaced apart from one another;
a turnaround guide track having at one end an entrythroat and at the opopsite end an exit, respectively aligned with the nips of said pairs of rollers;
a scanning station at said exit comprising a window establishing an optical plane;
a holddown member above said window biased only gravitationally;
and retaining means for slidably retaining said holddown member for movement toward and away from said plane for accommodation of different thicknesses of sheet passing therebetween.

10. A machine as defined in claim 9, in which said turnaround guide track extends through a curved arc of approximately 180° on a radius of curvature greater than the diametral dimension of said rollers.

11. A machine as defined in claim 10, in which said pairs of transport rollers are disposed in a common plane, extending generally vertically.

12. A copymaking machine including means defining a housing having spaced upright side frame structures on and between which are mounted, in combination:
means including an inwardly directed document delivery passage and an adjacent outwardly directed document discharge passage, and a first set of driven rollers positioned to engage and advance a document from said delivery passage and subsequently to reengage and regressively move the document into said discharge passage;
a transfer guide assembly receptive of the advancing document from said first set of rollers;
a turnaround device defining an arcuate throat having an inwardly opening entrance into which the document is advanced from said transfer guide assembly and a reversely opening exit substantially spaced from said first set of rollers;
a second set of driven rollers advancingly engageable with the document to advance it after leaving said exit; and
a scanning aperture device aligned with the exit side of said second set of rollers and including aperture-defining means and a superimposed document backup holddown plate floatingly opposing said aperture defining means to guide the document in a scanning plane from said second set of rollers to said first set of rollers for reengaging and moving the document into said discharge passage.

13. A machine as defined in claim 12, in which said backup holddown plate is gravitationally supported and is quickly manually liftable from said aperture device to clear a document jam.

14. A machine as defined in claim 12, in which a third set of driven rollers is positioned between said transfer guide assembly and said turnaround device to advance said document therebetween.

15. A machine as defined in claim 12, in which said transfer guide assembly comprises a unitary structure and said side frame structures have shoulder means thereon gravitationally supporting the transfer guide assembly, whereby this assembly is quickly removable for clearing a jammed document therefrom.

14. A machine as defined in claim 12, in which a third turnaround device is a self-contained, unitary structure, and said turnaround device and said frame structures have means thereon supporting the turnaround device in quick-moval for clearing a jam therefrom.
detachtable gravitational relation enabling its ready re- 17. A machine as defined in claim 14, in which said frame structures comprise spaced parallel plates which have identical aligned openings located between said first set of rollers and said second and third sets of rollers and through which said transfer guide assembly and said aperture device have extending end portions, the edges defining said apertures having shoulder means thereon on which said extending portions of said devices are respectively engaged.

18. A copymaking machine including means defining a housing having spaced upright side frame structures on and between which are mounted, in combination:
means including an inwardly directed document delivery passage and an adjacent outwardly directed document discharge passage, and a first set of driven rollers positioned to engage and advance a document from said delivery passage and subsequently to reengage and regressively move the document into said discharge passage;
a transfer guide assembly receptive of the advancing document from said first set of rollers;
a second set of driven rollers positioned to receive the advancing document from said transfer guide device;
a turnaround device defining an arcuate throat having an inwardly opening entrance into which the document is advanced from said second set of rollers, and a reversely opening exit substantially spaced from said first set of rollers;
a third set of driven rollers advancingly engageable with the document to advance it after leaving said exit; and
a scanning aperture device aligned between said third and said first sets of rollers spaced from said transfer guide assembly and including aperture-defining means and a superimposed document backup hold down plate floatingly opposing said aperture defining means to guide the document in a scanning plane from said third set of rollers to said first set of rollers for reengaging and moving the document into said discharge passage.

19. In a paper transport system of the character described including a first set of transport rollers and a second set of transport rollers spaced therefrom;
a transfer guide device comprising a pair of spaced plates defining a guide gap therebetween, and means fixedly securing the plates together;
and supporting means comprising a pair of parallel spaced upright frame plates having apertures therethrough defining edges having supporting shoulders on which said device is gravitationally supported and from which the device is freely removable at will.

20. In a paper transport system of the character described including a first set of transport rollers and a second set of transport rollers spaced therefrom;

a transfer guide device comprising a pair of spaced plates defining a guide gap therebetween, a manipulating handle on one of said plates, and means fixedly securing the plates together;

and supporting means including supporting shoulders on which said device is gravitationally supported and from which the device is freely removable at will.

21. A machine as defined in claim 2, including means cooperating with the opposite end portions of said holddown plate for retainingly guiding said holddown plate.

References Cited

UNITED STATES PATENTS

| 3,267,797 | 8/1966 | Fowlie et al. | 88—24 |
| 3,322,031 | 5/1967 | Ostensen | 88—24 |
| 3,330,179 | 7/1967 | Zerfahs et al. | 88—24 |

NORTON ANSHER, *Primary Examiner.*

RICHARD A. WINTERCORN, *Assistant Examiner.*

U.S. Cl. X.R.

353—104, 112; 355—27, 44, 65, 18